(12) United States Patent
Jiang et al.

(10) Patent No.: US 11,899,321 B2
(45) Date of Patent: Feb. 13, 2024

(54) LIQUID CRYSTAL DISPLAY PANEL AND LIQUID CRYSTAL DISPLAY DEVICE

(71) Applicants: HEFEI BOE DISPLAY TECHNOLOGY CO.,LTD., Anhui (CN); BOE TECHNOLOGY GROUP CO., LTD., Beijing (CN)

(72) Inventors: Liangliang Jiang, Beijing (CN); Heng Li, Beijing (CN); Lei Guo, Beijing (CN); Ke Dai, Beijing (CN); Yanping Liao, Beijing (CN); Seungmin Lee, Beijing (CN)

(73) Assignees: Hefei BOE Display Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 227 days.

(21) Appl. No.: 17/422,461

(22) PCT Filed: Feb. 26, 2020

(86) PCT No.: PCT/CN2020/076751
§ 371 (c)(1),
(2) Date: Jul. 13, 2021

(87) PCT Pub. No.: WO2021/168683
PCT Pub. Date: Sep. 2, 2021

(65) Prior Publication Data
US 2022/0342263 A1 Oct. 27, 2022

(51) Int. Cl.
*G02F 1/1362* (2006.01)

(52) U.S. Cl.
CPC .. *G02F 1/136209* (2013.01); *G02F 1/136286* (2013.01)

(58) Field of Classification Search
CPC ..................................................... G02F 1/1362
See application file for complete search history.

(56) References Cited

U.S. PATENT DOCUMENTS

2002/0071083 A1* 6/2002 Anno ................ G02F 1/133553
349/147
2006/0285062 A1* 12/2006 Kim .................... G02F 1/13394
349/156

(Continued)

FOREIGN PATENT DOCUMENTS

CN 101762916 A 6/2010
CN 103336391 A 10/2013

(Continued)

*Primary Examiner* — Sang V Nguyen
(74) *Attorney, Agent, or Firm* — The Webb Law Firm

(57) ABSTRACT

The present disclosure provides a liquid crystal display panel and a liquid crystal display device. The liquid crystal display panel includes a plurality of sub-pixels defined by a light shielding matrix, and an array substrate and an opposing substrate arranged to be spaced apart from each other. The opposing substrate includes a first substrate and a plurality of spacers, wherein the spacers are on a side of the first substrate close to the array substrate and being within a light shielding area of the light shielding matrix. The array substrate includes a second substrate and a plurality of protrusion structures, wherein the protrusion structures are on a side of the second substrate close to the opposing substrate, and being within the light shielding area of the light shielding matrix.

15 Claims, 9 Drawing Sheets

(56) References Cited

U.S. PATENT DOCUMENTS

| | | | |
|---|---|---|---|
| 2008/0198317 A1* | 8/2008 | Tseng | .................. G02F 1/13394 |
| | | | 349/138 |
| 2018/0120619 A1 | 5/2018 | Cho et al. | |
| 2019/0041710 A1* | 2/2019 | Liu | ................... G02F 1/133345 |
| 2019/0212607 A1* | 7/2019 | Tien | ..................... G02B 5/0236 |
| 2020/0174300 A1* | 6/2020 | Cheng | ................ H01L 27/1288 |

FOREIGN PATENT DOCUMENTS

| | | | |
|---|---|---|---|
| CN | 106353930 A | 1/2017 | |
| CN | 107255879 A | 10/2017 | |
| CN | 107272271 A | 10/2017 | |
| CN | 108020964 A | 5/2018 | |
| IN | 107255879 A | 10/2017 | |
| KR | 1020070074735 A | 7/2007 | |
| KR | 1020160069096 A | 6/2016 | |

\* cited by examiner

LIQUID CRYSTAL DISPLAY PANEL AND LIQUID CRYSTAL DISPLAY DEVICE

CROSS-REFERENCE TO RELATED APPLICATION

The present application is a U.S. National Stage Application under 35 U.S.C. § 371 of International Patent Application No. PCT/CN2020/076751, filed on Feb. 26, 2020, the disclosure of which is incorporated by reference herein in its entirety.

TECHNICAL FIELD

The present disclosure relates to a liquid crystal display panel and a liquid crystal display device.

BACKGROUND

Among the flat panel display devices, the liquid crystal display device occupies a dominant position in the product market due to the characteristics such as small volume, low power consumption, relatively low manufacturing cost, and no radiation. Improving the display quality of the liquid crystal display device and bring a better viewing experience to users has always been a main research direction of those skilled in the art.

SUMMARY

According to an aspect of embodiments of the present disclosure, a liquid crystal display panel is provided. The liquid crystal display panel comprises a plurality of sub-pixels defined by a light shielding matrix and arranged in an array, an array substrate and an opposing substrate spaced apart from the array substrate, wherein: the opposing substrate comprises a first substrate and a plurality of spacers, the plurality of spacers being on a side of the first substrate close to the array substrate and being within a light shielding area of the light shielding matrix; the array substrate comprises a second substrate and a plurality of protrusion structures, the plurality of protrusion structures being on a side of the second substrate close to the opposing substrate, and being within the light shielding area of the light shielding matrix; wherein the plurality of protrusion structures comprise a first protrusion structure and a second protrusion structure, an orthographic projection of the first protrusion structure on the second substrate and an orthographic projection of the second protrusion structure on the second substrate being between an orthographic projection of one of the plurality of spacers on the second substrate and a sub-pixel adjacent to the one of the plurality of spacers, and a minimum distance between the orthographic projection of the first protrusion structure on the second substrate and the orthographic projection of the one of the plurality of spacers on the second substrate being less than a minimum distance between the orthographic projection of the second protrusion structure on the second substrate and the orthographic projection of the one of the plurality of spacers on the second substrate.

In some embodiments, the orthographic projection of the one of the plurality of spacers on the second substrate, the orthographic projection of the first protrusion structure on the second substrate and the orthographic projection of the second protrusion structure on the second substrate are arranged along a first direction; and the minimum distance between the orthographic projection of the first protrusion structure on the second substrate and the orthographic projection of the one of the plurality of spacers on the second substrate, and a minimum distance between the orthographic projection of the second protrusion structure on the second substrate and the orthographic projection of the first protrusion structure on the second substrate are both not less than a maximum dimension of an orthographic projection of a top surface of the one of the plurality of spacers on the second substrate parallel to the first direction.

In some embodiments, the one of the plurality of spacers is in a truncated cone shape; and the minimum distance between the orthographic projection of the first protrusion structure on the second substrate and the orthographic projection of the one of the plurality of spacers on the second substrate, and the minimum distance between the orthographic projection of the second protrusion structure on the second substrate and the orthographic projection of the first protrusion structure on the second substrate are both not less than one half of a sum of a diameter of the top surface and a diameter of a bottom surface of the one of the plurality of spacers.

In some embodiments, a protrusion height of the second protrusion structure is greater than a protrusion height of the first protrusion structure.

In some embodiments, the protrusion structure is a strip-like protrusion extending along a second direction, or the protrusion structure comprises at least two sub-protrusions arranged to be spaced apart from each other along the second direction; wherein the second direction is parallel to the second substrate and orthogonal to the first direction.

In some embodiments, a maximum dimension of the orthographic projection of the one of the plurality of spacers on the second substrate parallel to the second direction is less than a distance between two distal ends of an orthographic projection of one of the plurality of protrusion structures on the second substrate.

In some embodiments, the plurality of spacers comprise a first spacer and a second spacer; the orthographic projection of the first protrusion structure on the second substrate and the orthographic projection of the second protrusion structure on the second substrate are between an orthographic projection of the first spacer on the second substrate and a sub-pixel adjacent to the first spacer; and the plurality of protrusion structures further comprise a third protrusion structure, wherein an orthographic projection of the third protrusion structure on the second substrate is between an orthographic projection of the second spacer on the second substrate and a sub-pixel adjacent to the second spacer, and a minimum distance between the orthographic projection of the third protrusion structure on the second substrate and the orthographic projection of the second spacer on the second substrate is equal to a minimum distance between the orthographic projection of the first protrusion structure on the second substrate and the orthographic projection of the first spacer on the second substrate.

In some embodiments, the array substrate comprises a first metal layer, a semiconductor layer and a second metal layer, a common electrode layer and a pixel electrode layer which are on the side of the second substrate close to the opposing substrate, wherein the first metal layer, the semiconductor layer, and the second metal layer are within the light shielding area of the light shielding matrix; each of the plurality of protrusion structures comprises a plurality of pattern layers, wherein a number of the pattern layers of the second protrusion structure is greater than a number of the pattern layers of the first protrusion structure; and the plurality of pattern layers comprise pattern layers in at least two of the first metal layer, the semiconductor layer, or the second metal layer.

In some embodiments, the plurality of pattern layers further comprise a pattern layer in the common electrode layer, and/or a pattern layer in the pixel electrode layer.

In some embodiments, the first metal layer comprises a gate line extending along a row direction, and the second metal layer comprises a data line extending along a column direction, wherein the orthographic projection of the one of the plurality of spacers on the second substrate is within an orthographic projection of the gate line on the second substrate.

In some embodiments, the first metal layer further comprises a common electrode line extending along the row direction and connected to the common electrode layer, wherein an orthographic projection of at least one of the plurality of protrusion structures on the second substrate is within an orthographic projection of the common electrode line on the second substrate.

In some embodiments, orthographic projections of the plurality of protrusion structures on the second substrate are distributed symmetrically on both sides of the gate line.

In some embodiments, the plurality of spacers are arranged in an array, and spacers located in the same row are all first spacers or are all second spacers.

In some embodiments, the first spacer and the second spacer are arranged alternately along a row direction.

In some embodiments, the plurality of spacers comprise a primary spacer and a secondary spacer, a height of the primary spacer being greater than a height of the secondary spacer, and the first spacer and the second spacer being both secondary spacers.

According to another aspect of embodiments of the present disclosure, a liquid crystal display device is provided. The liquid crystal display device comprises a driving circuit and the liquid crystal display panel according to any one of the foregoing technical solutions.

BRIEF DESCRIPTION OF THE DRAWINGS

The accompanying drawings which constitute part of this specification, illustrate the exemplary embodiments of the present disclosure, and together with this specification, serve to explain the principles of the present disclosure.

The present disclosure may be more explicitly understood from the following detailed description with reference to the accompanying drawings, in which:

FIG. 2b is a schematic cross-sectional structure view of the liquid crystal display panel according to an embodiment of the present disclosure at position F-F in FIG. 2a;

FIG. 3a is an enlarged schematic view of the array substrate of the liquid crystal display panel according to an embodiment of the present disclosure at position A in FIG. 2a;

FIG. 3b is a schematic cross-sectional view of the liquid crystal display panel according to an embodiment of the present disclosure at position C-C in FIG. 3a;

FIG. 4a is an enlarged schematic view of an array substrate of the liquid crystal display panel according to an embodiment of the present disclosure at position B in FIG. 2a;

FIG. 4b is a schematic cross-sectional view of the liquid crystal display panel according to an embodiment of the present disclosure at position D-D of FIG. 4a;

FIG. 5b is a schematic cross-sectional structure view of the liquid crystal display panel according to another embodiment of the present disclosure at position G-G in FIG. 5a;

Figure 1A:
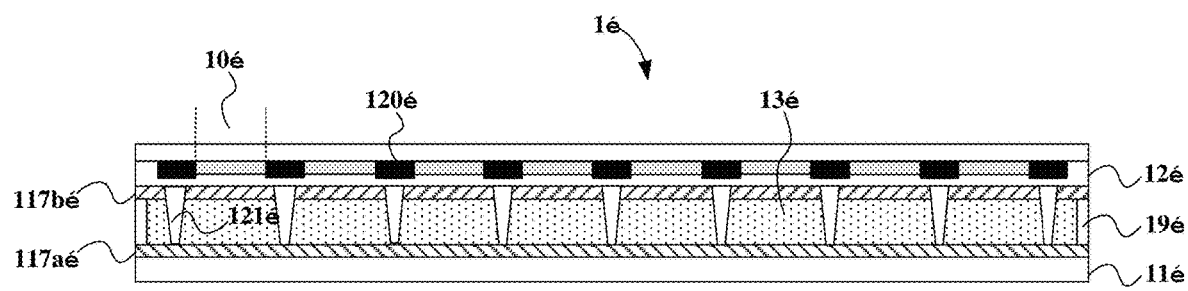
FIG. 1a is a schematic view of a cross-sectional structure of a liquid crystal display panel in a related art.

It should be understood that the dimensions of various parts shown in the accompanying drawings are not necessarily drawn according to actual proportional relations. In addition, the same or similar reference signs are used to denote the same or similar components.

DETAILED DESCRIPTION

Various exemplary embodiments of the present disclosure will now be described in detail in conjunction with the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "include", or the like means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (comprising technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

A liquid crystal display device comprises a liquid crystal display panel and a backlight module located on a light incident side of the liquid crystal display panel and providing backlight for the liquid crystal display panel. The liquid crystal display panel comprises a plurality of sub-pixels defined by a light shielding matrix, wherein each sub-pixel corresponds to one opening area of the light shielding matrix, and a plurality of adjacent sub-pixels with different colors constitute one pixel unit. For example, a green sub-pixel, a red sub-pixel and a blue sub-pixel adjacent to each other in a row direction constitute one pixel unit. The sub-pixels of the same pixel unit are mixed according to a certain ratio so that the pixel unit may display colors visible to naked eye.

As shown in FIG. 1a, a structure of a liquid crystal display panel 1' comprises: an array substrate 11' and an opposing substrate 12' which are arranged to be spaced apart from each other and aligned by a sealant 19' to form a liquid crystal cell, and liquid crystal 13' filled between the array substrate 11' and the opposing substrate 12'. An alignment layer 117a' is provided on a surface of the array substrate 11' on a side close to the liquid crystal 13', and an alignment layer 117b' is provided on a surface of the opposing substrate 12' on aside close to the liquid crystal 13'. The alignment layers 117a', 117b' are configured to induce liquid crystal molecules to be arranged at a predetermined tilt angle in an initial state. A plurality of spacers 121' are provided on a side of the opposing substrate 12' close to the array substrate 11'. The spacers 121' are usually arranged within a light shielding area of a light shielding matrix 120', so as to avoid affecting an aperture rate of the liquid crystal display panel 1' as much as possible. The light shielding area of the light shielding matrix refers to a projection area of the light shielding matrix in a direction perpendicular to the liquid crystal display panel. The aperture ratio of the liquid crystal display panel may be understood as a proportion of an effective light emitting area of the liquid crystal display panel occupied in a total area of the liquid crystal display panel.

Figure 1B:
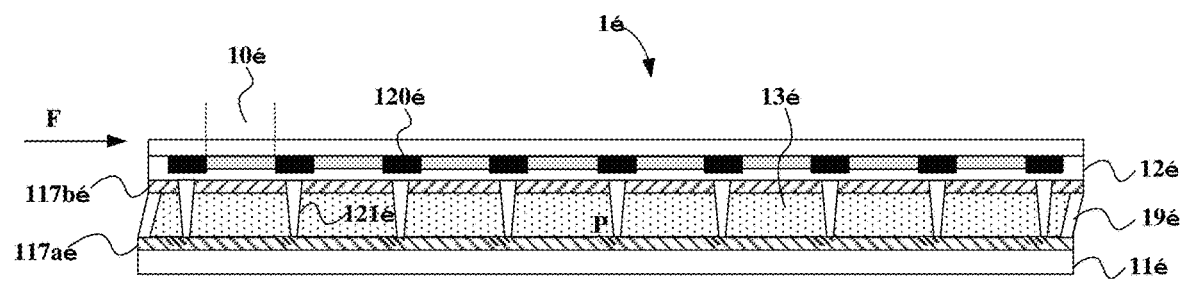
FIG. 1b is a schematic view of the displacement of the spacer when the liquid crystal display panel in the related art is subjected to an intense external force.
Figure 1C:
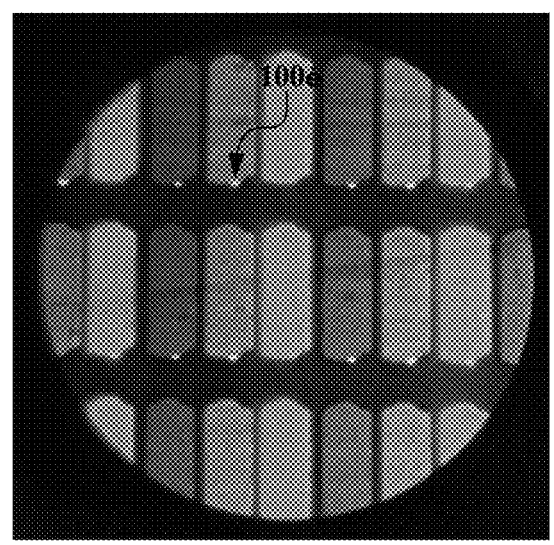
FIG. 1c is a schematic view of bright spots produced on the screen of the liquid crystal display panel in the related art after an alignment layer is scratched.

During the process of implementing the embodiments of the present disclosure, inventors of the present disclosure have found that, as shown in FIG. 1b, when the above-described liquid crystal display panel 1' is subjected to a relatively intense external force, such as a fall, it is possible that there is a parallel displacement between the array substrate 11' and the opposing substrate 12', which may cause the spacer 121' to shift and enter an opening area where the sub-pixel 10' is located. The spacer 121' which enters the opening area may scratch the alignment layer 117a' in this area (as shown at a position P), which results in a bright spot 100' as shown in FIG. 1c on the display screen.

To solve the above-described technical problem, the embodiments of the present disclosure provide a liquid crystal display panel and a liquid crystal display device.

In the embodiments of the present disclosure, a row direction refers to a transverse arrangement direction of an array, and a column direction refers to a longitudinal arrangement direction of the array. The row direction and the column direction are defined relative to one of the operation states of the liquid crystal display device, and should not be understood to be absolutely transverse and longitudinal direction.

Figure 2A:
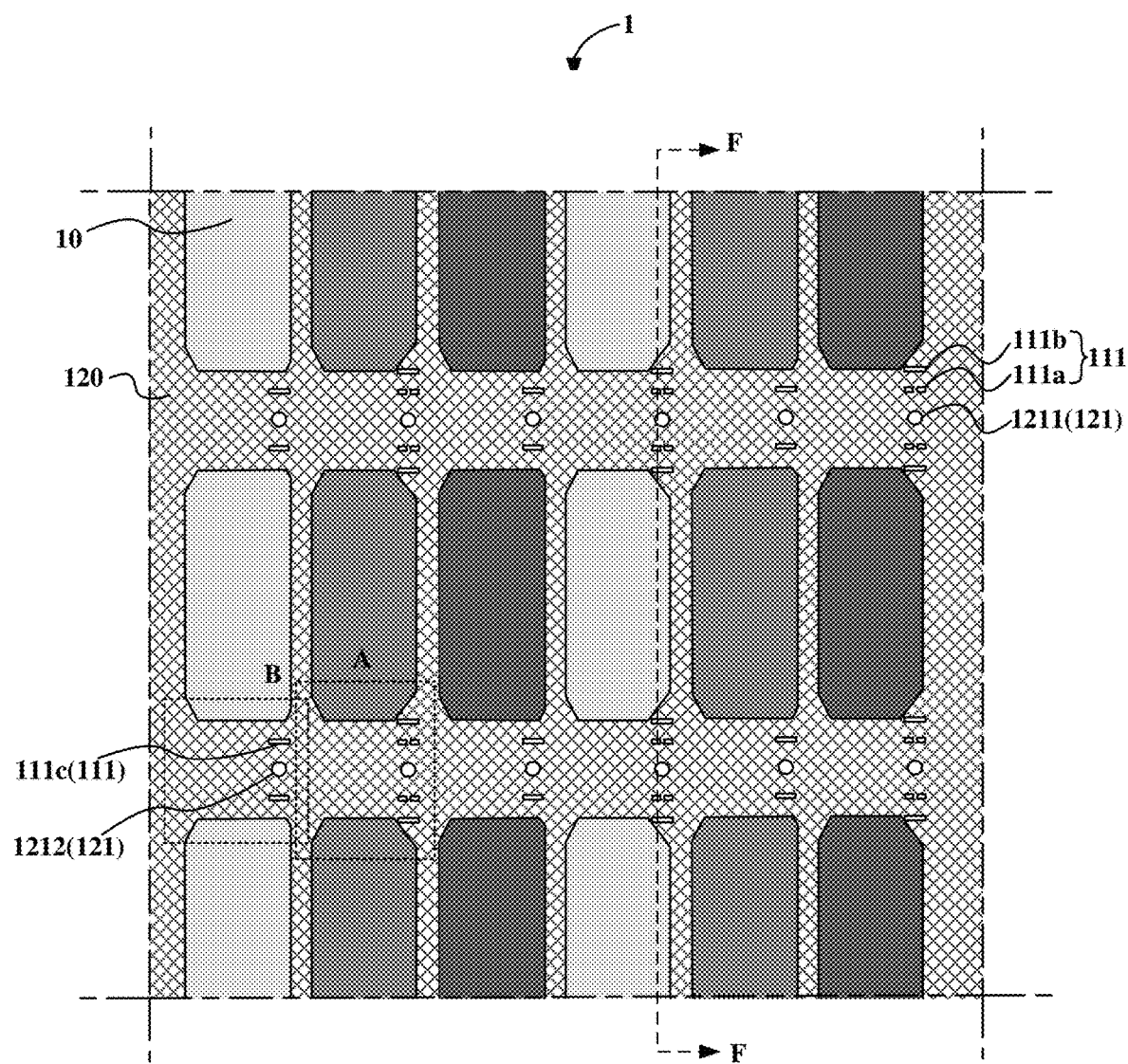
FIG. 2a is a front view of a partial structure of a liquid crystal display panel according to an embodiment of the present disclosure.
Figure 2B:
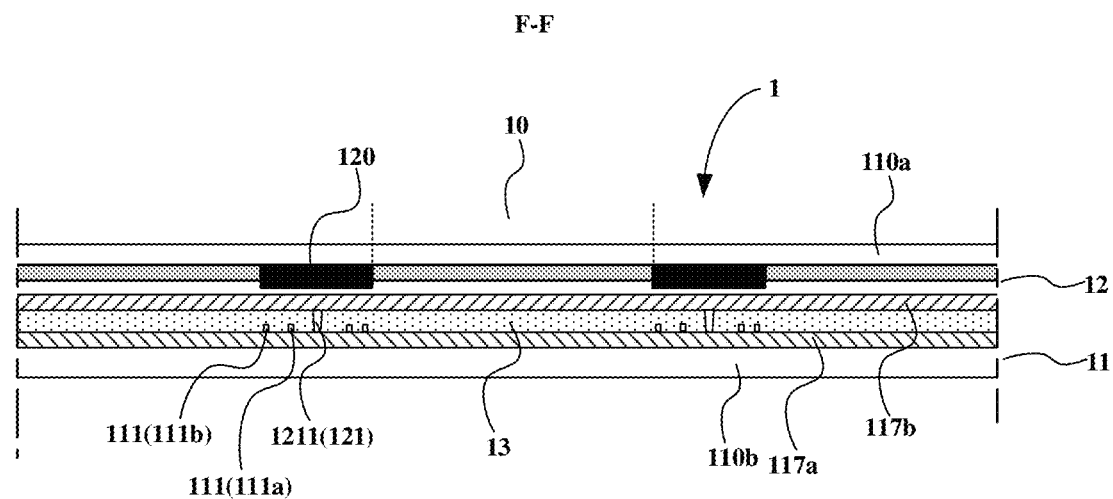

As shown in FIGS. 2a and 2b, a liquid crystal display panel 1 provided in an embodiment of the present disclosure comprises a plurality of sub-pixels 10 defined by a light shielding matrix 120 and arranged in an array. The liquid crystal display panel 1 comprises an array substrate 11 and an opposing substrate 12 spaced apart from the array substrate 11. The opposing substrate 12 comprises a first substrate 110a and a plurality of spacers 121, wherein the plurality of spacers 121 are located on aside of the first substrate 110a close to the array substrate 11 and located within a light shielding area of a light shielding matrix 120. The array substrate 11 comprises a second substrate 110b and a plurality of protrusion structures 111, wherein the plurality of protrusion structures 111 are located on a side of the second substrate 110b close to the opposing substrate 12 and located within the light shielding area of the light shielding matrix 120.

Figure 3A:
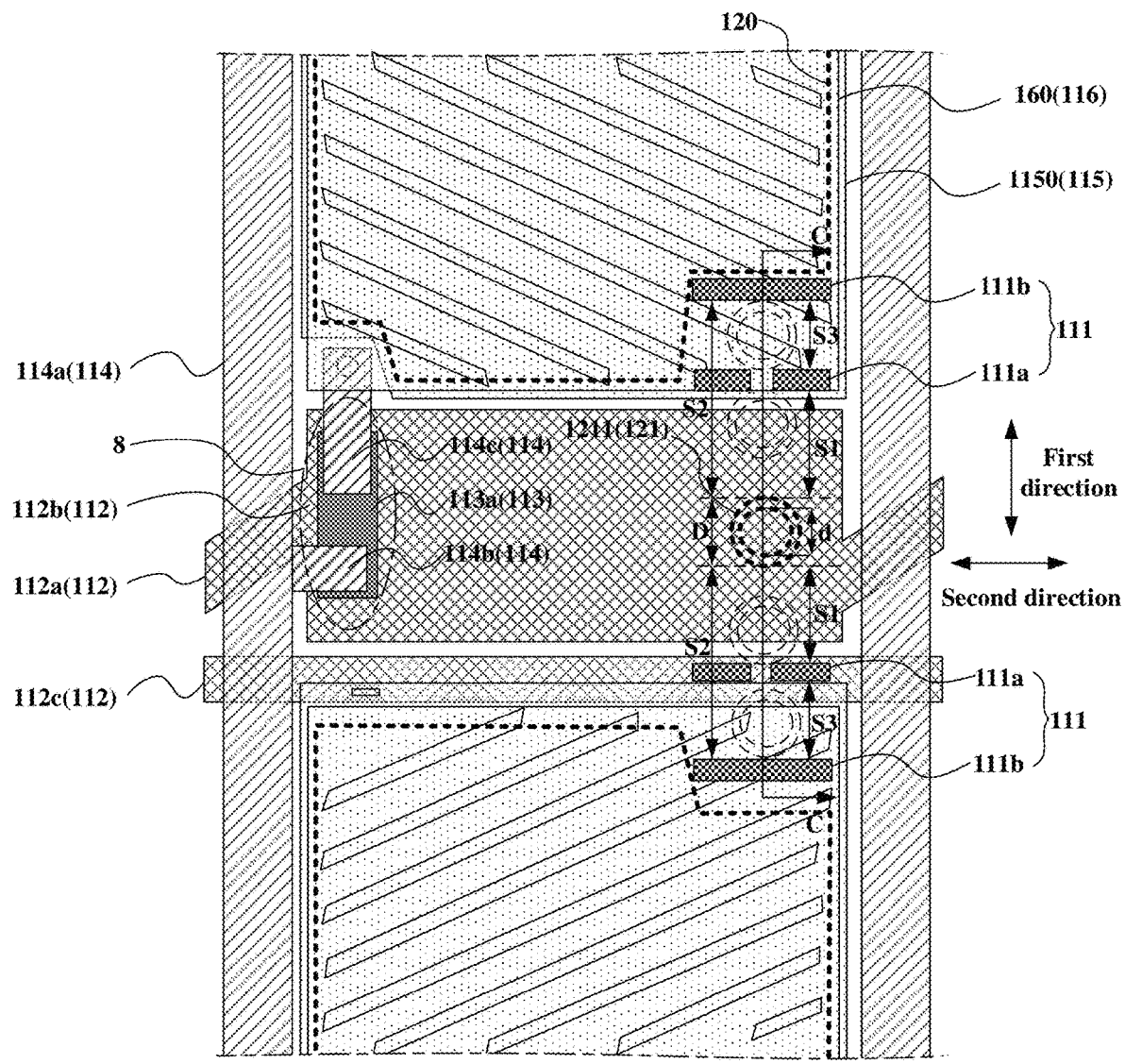
Figure 3B:
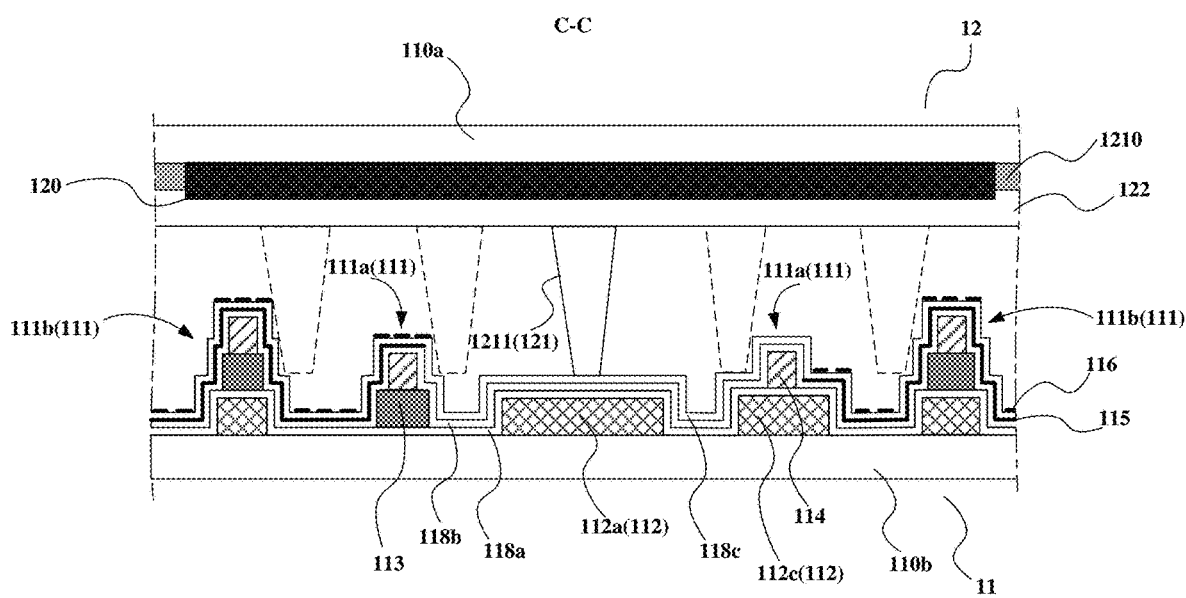

As shown in FIG. 3a and FIG. 3b, the plurality of protrusion structures 111 comprise a first protrusion structure 111a and a second protrusion structure 111b. Orthographic projections of the first protrusion structure 111a and the second protrusion structure 111b on the second substrate 110b are between an orthographic projection of the spacer 121 on the second substrate 110b and a sub-pixel 10 adjacent to the spacer. A minimum distance S1 between the orthographic projection of the first protrusion structure 111a on the second substrate 110b and the orthographic projection of the spacer 121 on the second substrate 110b (i.e., a minimum distance between contour lines of the two orthographic projection patterns) is less than a minimum distance S2 between the orthographic projection of the second protrusion structure 111b on the second substrate 110b and the orthographic projection of the spacer 121 on the second substrate 110b.

As shown in FIG. 2b, the array substrate 11 and the opposing substrate 12 of the liquid crystal display panel 1 are aligned by a sealant (not shown) to forma liquid crystal cell in which the liquid crystal 13 is filled. The sub-pixel 10 is the smallest display unit of the liquid crystal display panel. As shown in FIGS. 3a and 3b, and FIGS. 4a and 4b, in an embodiment of the present disclosure, a structure of the array substrate 11 comprises: the second substrate 110b; and a first metal layer 112, a first insulating layer 118a, a semiconductor layer 113, a second metal layer 114, a second insulating layer 118b, a common electrode layer 115, a third insulating layer 118c and a pixel electrode layer 116 which are on the side of the second substrate 110b close to the opposing substrate 12 and sequentially arranged along a direction away from the second substrate 110b. The first metal layer 112 comprises a gate line 112a extending along the row direction and a gate electrode 112b connected to the gate line 112a. The semiconductor layer 113 comprises an active layer 113a. An orthographic projection of the active layer 113a on the second substrate 110b overlaps with an orthographic projection of the gate 112b on the second substrate 110b. The second metal layer 114 comprises a data line 114a extending along the column direction, a source electrode 114b connected to the data line 114a, and a drain electrode 114c spaced apart from the source electrode 114b. Orthographic projections of the source electrode 114b and the drain electrode 114c on the second substrate 110b both overlap with the orthographic projection of the active layer 113a on the second substrate 110b. The gate electrode 112b, the active layer 113a, the source electrode 114b, and the drain electrode 114c constitute a basic structure of a thin film transistor 8. The common electrode layer 115 comprises a plurality of common electrode units 1150 arranged in an array and connected to each other. The common electrode units 1150 are in a planar shape, and each common electrode unit 1150 has an equal potential due to direct or indirect connection. The pixel electrode layer 116 comprises a plurality of pixel electrodes 160 having a slit structure and arranged in an array. The pixel electrode 160 is connected to the drain electrode 114c of the thin film transistor 8 through a via hole opened in the second insulating layer 118b. When the thin film transistor 8 as a switching device is turned on, a data signal is transmitted to the pixel electrode 160 through the data line 114a, so that an electric field is generated at an edge of the slit structure of the pixel electrode 160, and an electric field is also generated between the pixel electrode 160 and the common electrode 1150, thereby forming a multi-dimensional electric field so that it is possible to drive a majority of liquid crystal molecules of the sub-pixels to deflect.

It is worth mentioning that, the structure of the array substrate 11 is not limited to the above-described specific embodiments. In other embodiments of the present disclosure, the common electrode layer may also be directly formed on the substrate, and the first insulating layer, the semiconductor layer, the second metal layer, the second insulating layer and the like are arranged between the common electrode layer and the pixel electrode layer. In addition, the common electrode layer may also be on a side of the pixel electrode layer away from the substrate, wherein the pixel electrode is in a planar shape, and the common electrode unit has a slit structure.

A specific number of the pixel electrodes 160 that are insulated from the common electrode units 1150 and generate an electric field are not limited. For example, it is possible that an orthographic projection of one pixel electrode on the substrate falls within an orthographic projection of one common electrode unit on the substrate; it is possible that orthographic projections of two pixel electrodes on the substrate fall within the orthographic projection of one common electrode unit on the substrate; or it is also possible that orthographic projections of four pixel electrodes on the substrate fall within the orthographic projection of one common electrode unit on the substrate, and so on.

Figure 4A:
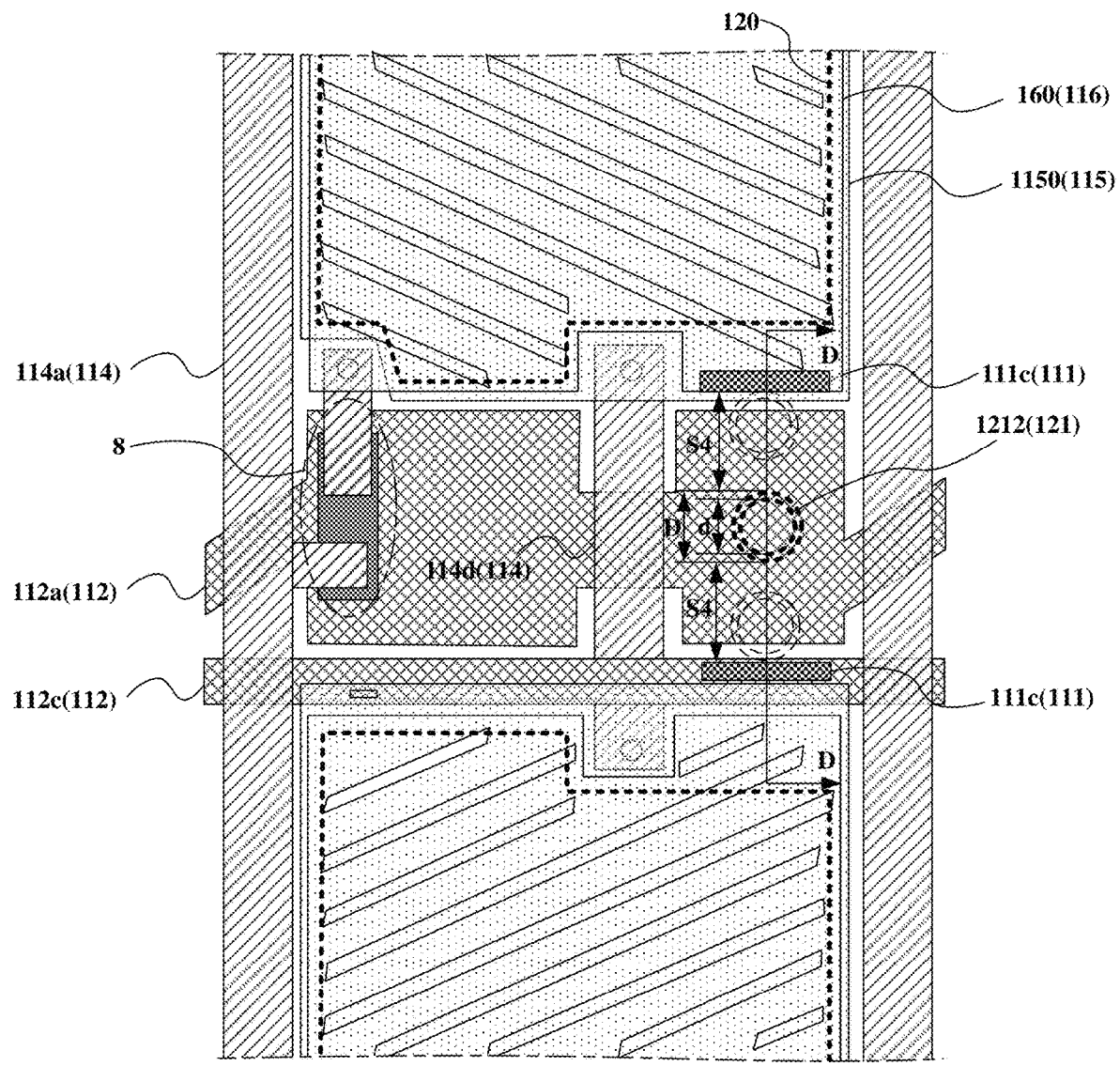
Figure 4B:
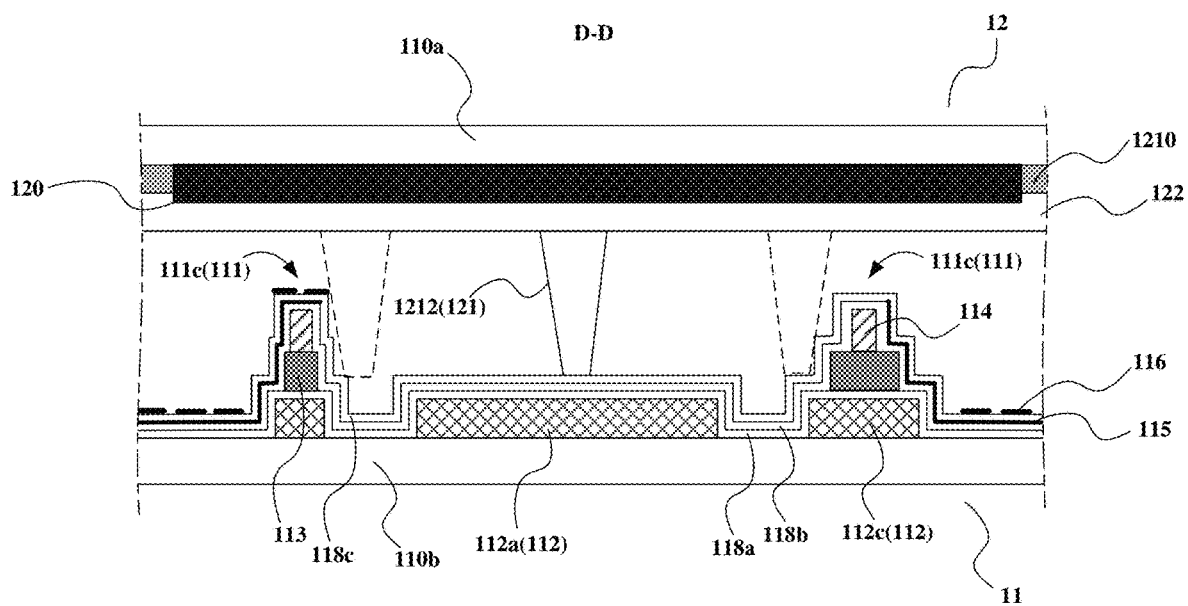

As shown in FIGS. 3b and 4b, in some embodiments of the present disclosure, the structure of the opposing substrate 12 comprises: a first substrate 110a; and a color resist layer, a light shielding matrix 120 and a transparent optical layer 122 which are located on a side of the first substrate 110a close to the array substrate 11 and sequentially arranged along a direction away from the first substrate 110a. The color resist layer comprises a plurality of color resist units 1210 arranged in an array, wherein the plurality of color resist units 1210 and the plurality of sub-pixels are arranged in one-to-one correspondence. The light shielding matrix 120 is configured to shield the leaked light that may be generated between the sub-pixels, and shield the light that may be reflected by metal lines such as the gate line 112a and the data line 114a (only part of the boundary of the light shielding matrix 120 is shown in FIGS. 3a and 4a). In this embodiment, the light shielding matrix 120 is provided on the opposing substrate 12. In some other embodiments of the present disclosure, the light shielding matrix may also be provided on the array substrate 11.

As shown in FIG. 2b, an alignment layer 117a is provided on an surface of the array substrate 11 on a side close to the liquid crystal 13, another alignment layer 117b is provided on a surface of the opposing substrate 12 on a side close to the liquid crystal 13, and the alignment layers 117a and 117b are configured to induce liquid crystal molecules to be arranged at a predetermined tilt angle in an initial state. The function of the spacer 121 is to support the array substrate 11 so as to maintain a uniform thickness of the cells of the liquid crystal display panel to support the normal display of the liquid crystal display panel. A density of the spacers 121 is not limited. For example, the number ratio of the spacers 121 to the sub-pixels 10 may be designed to be 1/1, 1/2, 1/3, or 1/4, or the like. The spacer 121 is made from an organic material with elasticity, for example transparent optical glue, optically transparent resin or polyacrylate glue. The spacer 121 is formed on the opposing substrate 12 through a patterning process, and arranged within a light shielding area of the light shielding matrix 120. A specific shape of the spacer 121 is not limited. For example, the spacer 121 has a cylindrical shape, a prismatic shape, or a truncated cone shape.

Figure 5A:
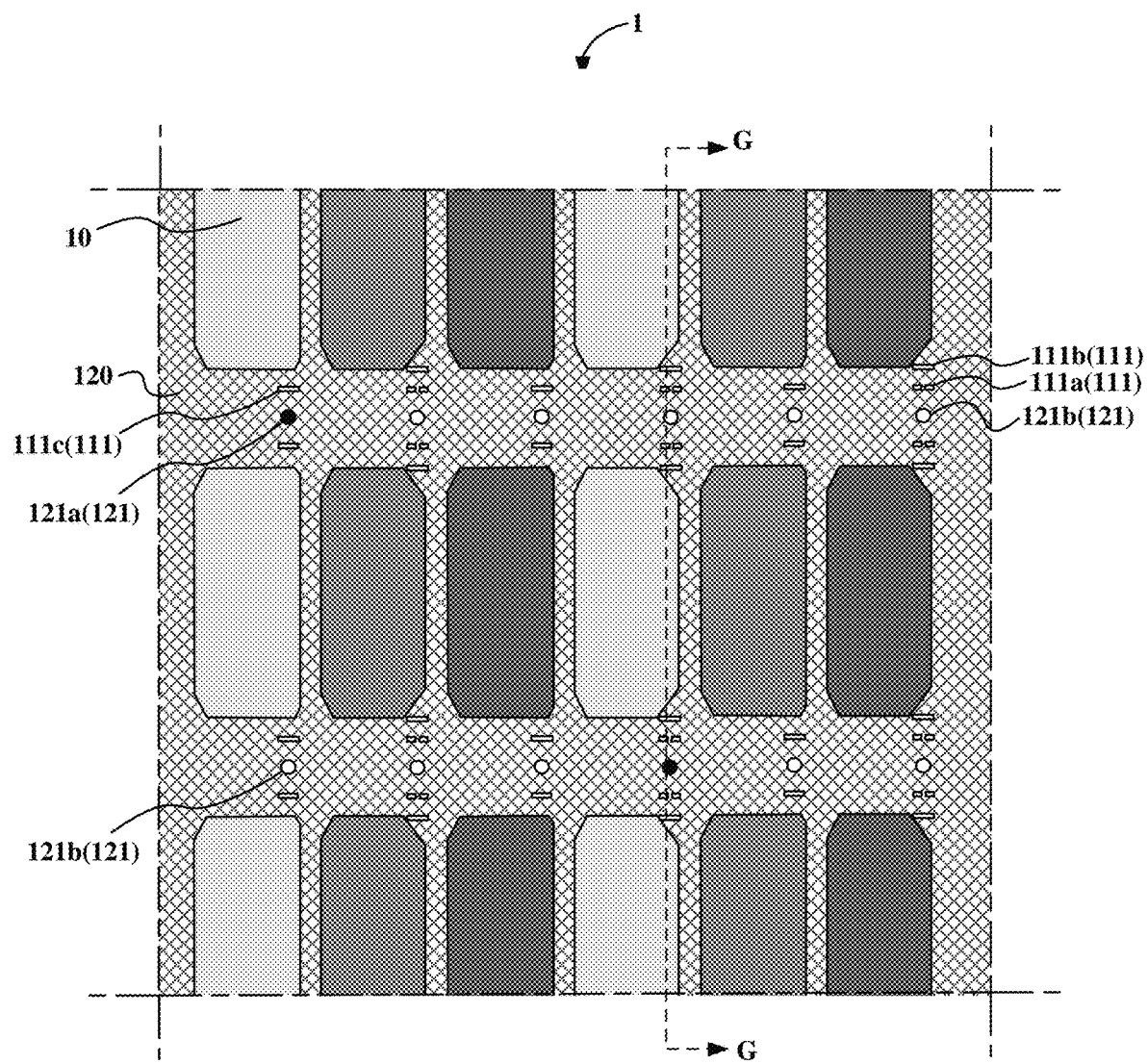
FIG. 5a is a front view of a partial structure of a liquid crystal display panel according to another embodiment of the present disclosure.
Figure 5B:
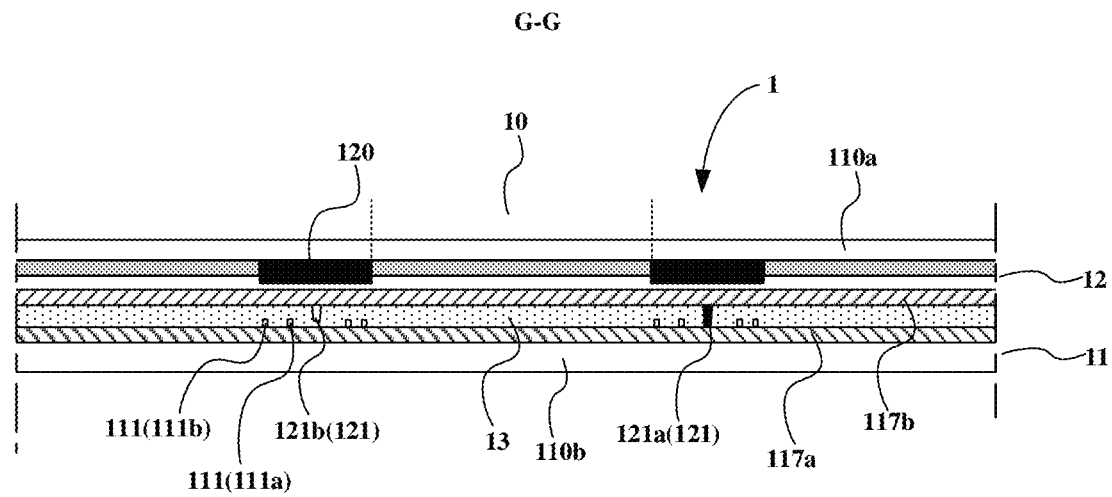

In some embodiments of the present disclosure, as shown in FIGS. 5a and 5b, the plurality of spacers 121 arranged on the opposing substrate 12 comprise a primary spacer 121a and an secondary spacer 121b. A height of the primary spacer 121a is greater than a height of the secondary spacer 121b. In normal operation conditions of the liquid crystal display panel, the higher primary spacer 121a plays a major supporting role. When the liquid crystal display panel is pressed by an external force or subjected at a low temperature, the thickness of the cell of the liquid crystal display panel is reduced, and the primary spacer 121a is compressed. At this time, the shorter secondary spacer 121b plays a supplementary supporting role, thereby continuing to maintain a uniform thickness of the cells of the liquid crystal display panel. In some embodiments of the present disclosure, the secondary spacers account for about 98% of the total number of the spacers, the protrusion structures described previously are arranged between the secondary spacers and the sub-pixels adjacent to the secondary spacers, and the protrusion structures described previously are not arranged between the primary spacers and the sub-pixels adjacent to the primary spacers. In other embodiments of the present disclosure, as shown in FIG. 5a, the protrusion structures 111 described above may also be arranged between the primary spacer 121a and the sub-pixel 10 adjacent to the primary spacer 121a.

In the related art, when the liquid crystal display panel is subjected to a relatively intense external force, the spacer which entering the opening area where the sub-pixels are located may scratch the alignment layer in the area, which results in abnormal bright spots on the display screen. In the technical solutions of the above-described embodiments of the present disclosure, the first protrusion structure 111a and the second protrusion structure 111b are arranged between some spacers 121 and adjacent sub-pixels 10. As shown in FIGS. 3a and 3b, a minimum distance S1 between the orthographic projection of the first protrusion structure 111a on the second substrate 110b and the orthographic projection of the spacer 121 on the second substrate 110b is less than a minimum distance S2 between the orthographic projection of the second protrusion structure 111b on the second substrate 110b and the orthographic projection of the spacer 121 on the second substrate 110b. That is, the first protrusion structure 111a and the second protrusion structure 111b are sequentially arranged along a direction close to the sub-pixel 10, also i.e., arranged on a path by which the spacer 121 invades into the opening area. In this way, it is possible to effectively reduce or even avoid abnormal bright spots resulting from the spacer 121 invading into the opening area and further scratching the alignment layer.

In some embodiments of the present disclosure, as shown in FIGS. 3a and 3b, the orthographic projections of the spacer 121, the first protrusion structure 111a, and the second protrusion structure 111b on the second substrate 110b are arranged along a first direction (for example, along the column direction). The minimum distance S1 between the orthographic projection of the first protrusion structure 111a on the second substrate 110b and the orthographic projection of the spacer 121 on the second substrate 110b, and a minimum distance S3 between the orthographic projection of the second protrusion structure 111b on the second substrate 110b and the orthographic projection of the first protrusion structure 111a on the second substrate 110b are both not less than a maximum dimension d of an orthographic projection of a top surface of the spacer 121 on the second substrate 110b parallel to the first direction. That is, when the spacer 121 is displaced along the first direction, a distance provided between the spacer 121 and the first protrusion structure 111a, and a distance provided between the first protrusion structure 111a and the second protrusion structure 111b can accommodate the top surface of the spacer 121.

The top surface of the spacer 121 refers to a surface of the spacer 121 on a side close to the array substrate 11, and a bottom surface of the spacer 121 refers to a surface of the spacer 121 on a side away from the array substrate 11. In this way, the protrusion structure 111 may not only produce a blocking effect but also produce a cushioning effect over the displacement of the spacer 121, so that it is possible to more effectively prevent the spacer 121 from invading into the opening area where the sub-pixel is located. In some embodiments of the present disclosure, the spacer 121 is in a truncated cone shape, and the minimum distance S1 between the orthographic projection of the first protrusion structure 111a on the second substrate 110b and the orthographic projection of the spacer 121 on the second substrate 110b and the minimum distance S3 between the orthographic projection of the second protrusion structure 111b on the second substrate 110b and the orthographic projection of the first protrusion structure 111a on the second substrate 110b are both not less than one half of a sum of a diameter d of the top surface and a diameter D of the bottom surface of the spacer 121.

As shown in FIG. 3b, in some embodiments of the present disclosure, a protrusion height of the second protrusion structure 111b is greater than a protrusion height of the first protrusion structure 111a. In this way, the difficulty of the invasion of the spacer into the opening area is further increased, and the possibility of the invasion of the spacer into the opening area is further reduced.

As shown in FIG. 2a, in some embodiments of the present disclosure, the plurality of spacers 121 comprise a first spacer 1211 and a second spacer 1212. As shown in FIGS. 2a, 3a and 3b, the orthographic projections of the first protrusion structure 111a and the second protrusion structure 111b on the second substrate 110b are between an orthographic projection of the first spacer 1211 on the second substrate 110b and a sub-pixel 10 adjacent to the first spacer. As shown in FIGS. 2a, 4a and 4b, the plurality of protrusion structures 111 further comprise a third protrusion structure 111c. An orthographic projection of the third protrusion structure 111c on the second substrate 110b is between an orthographic projection of the second spacer 1212 on the second substrate 110b and a sub-pixel 10 adjacent to the second spacer, and a minimum distance S4 between the orthographic projection of the third protrusion structure 111c on the second substrate 110b and the orthographic projection of the second spacer 1212 on the second substrate 110b is substantially equal to a minimum distance S1 between the orthographic projection of the first protrusion structure 111a on the second substrate 110b and the orthographic projection of the first spacer 1211 on the second substrate 110b. The minimum distance S4 is not less than the maximum dimension d of the orthographic projection of the top surface of the spacer 121 on the second substrate 110b parallel to the first direction. In this embodiment, two protrusion structures are provided between the first spacer 1211 and the sub-pixel 10 adjacent to the first spacer 1211, and one protrusion structure is provided between the second spacer 1212 and the sub-pixel 10 adjacent to the second spacer 1212. On the premise of producing an effective blocking effect over the displacement of the spacer, the design in this embodiment also incorporates the aperture ratio of the liquid crystal display panel.

In the embodiment of the present disclosure, a specific shape of the protrusion structure 111 described previously is not limited. For example, the protrusion structure is a strip-like protrusion extending along a second direction (for example, the second protrusion structure 111b in FIG. 3a). Or, the protrusion structure 111 comprises at least two sub-protrusions arranged to be spaced apart from each other along the second direction (for example, the first protrusion structure 111a in FIG. 3a). The second direction is parallel to the second substrate 110b and orthogonal to the first direction. For example, the second direction is the row direction. A specific shape of the sub-protrusion is not limited. For example, the sub-protrusions may be cylindrical, or in a strip-like shape extending along the second direction.

In an embodiment, a maximum dimension of the orthographic projection of the spacer 121 on the second substrate 110b parallel to the second direction is less than a distance between two distal ends of the orthographic projection of the protrusion structure 111 on the second substrate 110b. In addition, the orthographic projection of the spacer 121 on the second substrate 110b may be substantially located on a perpendicular bisector of the second protrusion structure 111b extending along the second direction. These designs further ensure the effective blocking effect of the protrusion structure 111 over the spacer 121.

In some embodiments of the present disclosure, the first metal layer 112, the semiconductor layer 113, and the second metal layer 114 described above are within the light shielding area of the light shielding matrix 120 so as to be shielded by the light shielding matrix 120. The protrusion structure 111 comprises a plurality of pattern layers. The plurality of pattern layers comprise pattern layers in at least two of the first metal layer 112, the semiconductor layer 113 or the second metal layer 114.

The pattern layer of the protrusion structure 111 refers to a structure layer that contributes to the protrusion height of the protrusion structure 111. Adjacent pattern layers may be stacked or separated by other layers such as an insulating layer covering the entire substrate. In some embodiments, for example, the protrusion structure comprises a pattern layer in the first metal layer and a pattern layer located in the semiconductor layer. For another example, as shown in FIG. 3b, the protrusion structure 111 comprises a pattern layer in the first metal layer 112 and a pattern layer in the second metal layer 114. For another example, as shown in FIG. 3b, the protrusion structure 111 comprises a pattern layer in the semiconductor layer 113 and the pattern layer on the second metal layer 114. For another example, as shown in FIG. 3b, the protrusion structure 111 comprises the pattern layer in the first metal layer 112, the pattern layer in the semiconductor layer 113, and the pattern layer in the second metal layer 114. In addition, the protrusion structure 111 may further comprise a pattern layer in the common electrode layer 115 or a pattern layer in the pixel electrode layer 116. Since a thickness of the common electrode layer 115 and the pixel electrode layer 116 is much less than a thickness of the first metal layer 112, the semiconductor layer 113, and the second metal layer 114, it is possible to omit the contribution to the protrusion height. It suffices to use a conventional patterning process when the common electrode layer and the pixel electrode layer in the array substrate 11 are produced.

The pattern layer on the array substrate is generally formed by dry etching or wet etching, and there is a certain angle between an etched section and a manufactured base surface. In order to make the etching process more easily controlled, as shown in FIGS. 3b and 4b, in the plurality of pattern layers of the protrusion structure, an orthographic projection of the pattern layer further away from the second substrate 110b on the substrate falls within an orthographic projection of the pattern layer closer to the substrate on the substrate. The plurality of pattern layers are in a stepped shape when they are manufactured.

In some embodiments, one of the pattern layers of the protrusion structure 111 and the gate line 112a are in the same first metal layer 112 and thus may be formed in the same patterning process; one of the pattern layers of the protrusion structure 111 and the active layer 113a are in the same semiconductor layer 113 and thus may be formed in the same patterning process; one of the pattern layers of the protrusion structure 111 and the data line 114a are in the same second metal layer 114 and thus may be formed in the same patterning process. In addition, the pattern layer of the protrusion structure 111 may also be a part of the common electrode layer 115 or a part of the pixel electrode layer 116. By using the design in this embodiment, it is beneficial to simplify the manufacturing process and reduce the manufacturing cost. In this embodiment, although the first insulating layer 118a, the second insulating layer 118b, and the third insulating layer 118c cover some or all of the pattern layers of the protrusion structure 111, there is no contribution to increase the protrusion height of the protrusion structure 111.

According to the height requirement of the protrusion structure, each pattern layer of the protrusion structure may be flexibly designed. As shown in FIG. 3b, in some embodiments, the protrusion height of the second protrusion structure 111b is greater than the protrusion height of the first protrusion structure 111a. In terms of structural design, a number of the pattern layers of the second protrusion structure 111b is greater than a number of the pattern layers of the first protrusion structure 111a. After the influence of the common electrode layer 115 and the pixel electrode layer 116 on the protrusion height is omitted, the first protrusion structure 111a comprises two pattern layers, which are located in the semiconductor layer 113 and the second metal layer 114 respectively, or located in the first metal layer 112 and the second metal layer 114 respectively; and the second protrusion structure 111b comprises three pattern layers, which are located in the first metal layer 112, the semiconductor layer 113, and the second metal layer 114 respectively.

In some embodiments of the present disclosure, as shown in FIGS. 3a, 3b, 4a, and 4b, the orthographic projection of the spacer 121 on the second substrate 110b is within an orthographic projection of the gate line 112a on the second substrate 110b. There is a distance between the orthographic projection of each protrusion structure 111 on the second substrate 110b and the orthographic projection of the gate line 112a on the second substrate 110b. The spacer 121 is provided directly above the gate line 112a, so that it is possible to effectively utilize the light shielding area where the gate line 112a is located, thereby avoiding affecting the aperture ratio of the liquid crystal display panel as much as possible. In some embodiments of the present disclosure, the orthographic projections of the protrusion structures 111 on the second substrate 110b are distributed symmetrically on both sides of the orthographic projection of the gate line 112a on the second substrate 110b. That is, the protrusion structures 111 are distributed symmetrically on both sides of the gate line 112a, which may produce a favorable blocking and cushioning effect over the displacement of the spacer 121 to both sides of the gate line 112a. The spacer 121 and the protrusion structure 111 may be arranged at the intersection of the gate line 112a and the data line 114a, close to one of the corners of the substantially rectangular sub-pixel 10, so as to reduce the influence on an area of the opening area as much as possible.

In some embodiments of the present disclosure, as shown in FIGS. 3a, 3b, 4a, and 4b, the first metal layer 112 further comprises a common electrode line 112c extending along the row direction and connecting the common electrode layer 115 through a via hole. The common electrode line 112c is arranged between two adjacent rows of sub-pixels and on a side of the gate line 112a, and connects the common electrodes 1150 arranged along the row direction through via holes. In this embodiment, orthographic projections of some first protrusion structures 111a and some third protrusion structures 111c on the second substrate 110b fall within an orthographic projection of the common electrode line 112c on the substrate 110c. That is, a part of the common electrode line 112c also serves as one of the pattern layers of these protrusion structures. There is a distance between the orthographic projection of the second protrusion structure 111b on the second substrate 110b and an orthographic projection of the common electrode line 112c on the second substrate 110b. Some common electrode units 1150 of the common electrode layer 115 that are adjacent in the column direction may be connected by a via hole and a jumper 114d. The jumper 114d may be located in the second metal layer 114 and formed in the same patterning process as the data line 114a. The common electrodes 1150 of the common electrode layer 115 are connected to each other through the common electrode line 112c and the jumper 114d, and a common voltage signal is more uniformly transmitted to the common electrode layer 115 through the common electrode line 112c and the jumper 114d, which is beneficial to reduce the in-plane voltage drop of the common electrode layer 115. By using the design in this embodiment, one of the pattern layers of some protrusion structures is formed at the same time when the manufacturing of the common electrode line 112c is completed, so that the manufacturing process of the array substrate is further simplified and the manufacturing cost is further reduced.

As shown in FIG. 2a, in the embodiment of the present disclosure, the orthographic projections of the plurality of spacers 121 on the second substrate 110b are arranged in an array, and the spacers 121 in the same column are all the first spacers 1211 described previously or are all the second spacers 1212 described previously. Moreover, the first spacers 1211 and the second spacers 1212 are arranged alternately along the row direction. In some embodiments, the third protrusion structure is provided between an odd-numbered column of sub-pixels and a spacer adjacent to the odd-numbered column of sub-pixels, and the first protrusion structure and the second protrusion structure are provided between an even-numbered column of sub-pixels and a spacer adjacent to the even-numbered column of sub-pixels. In other embodiments, the third protrusion structures are provided between the 1st, 5th, 9th, 13th . . . columns of sub-pixels and the spacers adjacent to the 1st, 5th, 9th, 13th . . . columns of sub-pixels, and the first protrusion structures and the second protrusion structures are provided between the 3rd, 7th, 11th, 15th . . . columns of sub-pixels and the spacers adjacent to the 3rd, 7th, 11th, 15th . . . columns of sub-pixels. Since the arrangement density and arrangement method of the spacers 121 may be in a plurality of designs, more arrangement methods of the protrusion structure will not be listed one by one here. The design in this embodiment incorporates both the aperture ratio of the liquid crystal display panel and the blocking effect over the displacement of the spacer. In addition, the protrusion structures are regularly arranged, thereby making the manufacturing process more easily controlled.

Figure 6:
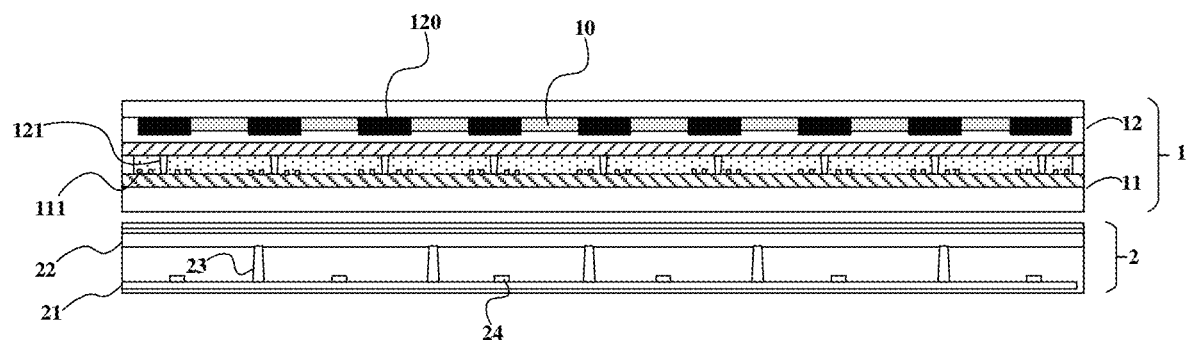
FIG. 6 is a schematic view of a cross-sectional structure of a liquid crystal display device according to an embodiment of the present disclosure.

As shown in FIG. 6, the embodiments of the present disclosure also provide a liquid crystal display device. The liquid crystal display device comprises a driving circuit and the liquid crystal display panel 1 according to any one of the foregoing embodiments, wherein the driving circuit is not shown by omission. Since the phenomenon of abnormal bright spots in the screen of the liquid crystal display panel 1 is reduced, the liquid crystal display device presents a favorable display quality. A product type of the liquid crystal display device is not limited. For example, the liquid crystal display device is a display, a tablet computer, a television, a mobile phone, electronic paper or the like.

As shown in FIG. 6, the liquid crystal display device further comprises a backlight module 2 located on a side of the array substrate 11 away from the opposing substrate 12. A specific type of the backlight module 2 is not limited. For example, the backlight module is a direct-lit type backlight module or an edge-lit type backlight module. In the embodiment shown in FIG. 6 of the present disclosure, the backlight module 2 is the direct-lit type backlight module, wherein a plurality of LED light source electrodes 24 are uniformly distributed on a surface of a reflective sheet 21.

The reflective sheet 21 and a diffuser plate 22 of the direct-lit type backlight module generally maintain a certain distance therebetween by a plurality of support struts 23. In the related art, when the liquid crystal display device containing the direct-lit type backlight module is subjected to a relatively intense external force, the support strut may press the liquid crystal display panel, so that it is more likely to cause the displacement and deformation of the spacer, and further produce abnormal bright spots. In the embodiments of the present disclosure, the first protrusion structure and the second protrusion structure provided between the spacer and the adjacent sub-pixel may produce a multi-stage blocking effect on the spacer, thereby effectively reducing or even avoiding abnormal bright spots resulting from the spacer invading into the opening area and scratching the alignment layer, and presenting a favorable product quality.

Hereto, various embodiments of the present disclosure have been described in detail. Some details well known in the art are not described in order to avoid obscuring the concept of the present disclosure. According to the above description, those skilled in the art would fully understand how to implement the technical solutions disclosed here.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments or equivalently substitution of part of the technical features may be made without departing from the scope and spirit of the present disclosure. The scope of the present disclosure is defined by the appended claims.

What is claimed is:

1. A liquid crystal display panel, comprising a plurality of sub-pixels defined by a light shielding matrix and arranged in an array, an array substrate, and an opposing substrate spaced apart from the array substrate, wherein:
   the opposing substrate comprises a first substrate and a plurality of spacers, the plurality of spacers being on a side of the first substrate close to the array substrate and being within a light shielding area of the light shielding matrix;
   the array substrate comprises a second substrate and a plurality of protrusion structures, the plurality of protrusion structures being on a side of the second substrate close to the opposing substrate, and being within the light shielding area of the light shielding matrix;
   wherein the plurality of protrusion structures comprise a first protrusion structure and a second protrusion structure, an orthographic projection of the first protrusion structure on the second substrate and an orthographic projection of the second protrusion structure on the second substrate being between an orthographic projection of one of the plurality of spacers on the second substrate and a sub-pixel adjacent to the one of the plurality of spacers, and a minimum distance between the orthographic projection of the first protrusion structure on the second substrate and the orthographic projection of the one of the plurality of spacers on the second substrate being less than a minimum distance between the orthographic projection of the second protrusion structure on the second substrate and the orthographic projection of the one of the plurality of spacers on the second substrate; and
   at least one of the first protrusion structure or the second protrusion structure comprises at least two sub-protrusions arranged to be spaced apart from each other along a second direction, wherein the second direction is parallel to the second substrate and orthogonal to the first direction.

2. The liquid crystal display panel according to claim 1, wherein:
   the orthographic projection of the one of the plurality of spacers on the second substrate, the orthographic projection of the first protrusion structure on the second substrate and the orthographic projection of the second protrusion structure on the second substrate are arranged along a first direction; and
   the minimum distance between the orthographic projection of the first protrusion structure on the second substrate and the orthographic projection of the one of the plurality of spacers on the second substrate, and a minimum distance between the orthographic projection of the second protrusion structure on the second substrate and the orthographic projection of the first protrusion structure on the second substrate are both not less than a maximum dimension of an orthographic projection of a top surface of the one of the plurality of spacers on the second substrate parallel to the first direction.

3. The liquid crystal display panel according to claim 2, wherein:
the one of the plurality of spacers is in a truncated cone shape; and
the minimum distance between the orthographic projection of the first protrusion structure on the second substrate and the orthographic projection of the one of the plurality of spacers on the second substrate, and the minimum distance between the orthographic projection of the second protrusion structure on the second substrate and the orthographic projection of the first protrusion structure on the second substrate are both not less than one half of a sum of a diameter of the top surface and a diameter of a bottom surface of the one of the plurality of spacers.

4. The liquid crystal display panel according to claim 2, wherein a protrusion height of the second protrusion structure is greater than a protrusion height of the first protrusion structure.

5. The liquid crystal display panel according to claim 2, wherein a maximum dimension of the orthographic projection of the one of the plurality of spacers on the second substrate parallel to the second direction is less than a distance between two distal ends of an orthographic projection of one of the plurality of protrusion structures on the second substrate.

6. The liquid crystal display panel according to claim 1, wherein:
the plurality of spacers comprise a first spacer and a second spacer;
the orthographic projection of the first protrusion structure on the second substrate and the orthographic projection of the second protrusion structure on the second substrate are between an orthographic projection of the first spacer on the second substrate and a sub-pixel adjacent to the first spacer; and
the plurality of protrusion structures further comprise a third protrusion structure, wherein an orthographic projection of the third protrusion structure on the second substrate is between an orthographic projection of the second spacer on the second substrate and a sub-pixel adjacent to the second spacer, and a minimum distance between the orthographic projection of the third protrusion structure on the second substrate and the orthographic projection of the second spacer on the second substrate is equal to a minimum distance between the orthographic projection of the first protrusion structure on the second substrate and the orthographic projection of the first spacer on the second substrate.

7. The liquid crystal display panel according to claim 6, wherein the array substrate comprises a first metal layer, a semiconductor layer and a second metal layer, a common electrode layer and a pixel electrode layer which are on the side of the second substrate close to the opposing substrate, wherein the first metal layer, the semiconductor layer, and the second metal layer are within the light shielding area of the light shielding matrix;
each of the plurality of protrusion structures comprises a plurality of pattern layers, wherein a number of the pattern layers of the second protrusion structure is greater than a number of the pattern layers of the first protrusion structure; and
the plurality of pattern layers comprise pattern layers in at least two of the first metal layer, the semiconductor layer, or the second metal layer.

8. The liquid crystal display panel according to claim 7, wherein the plurality of pattern layers further comprise a pattern layer in the common electrode layer, and/or a pattern layer in the pixel electrode layer.

9. The liquid crystal display panel according to claim 7, wherein the first metal layer comprises a gate line extending along a row direction, and the second metal layer comprises a data line extending along a column direction, wherein the orthographic projection of the one of the plurality of spacers on the second substrate is within an orthographic projection of the gate line on the second substrate.

10. The liquid crystal display panel according to claim 9, wherein the first metal layer further comprises a common electrode line extending along the row direction and connected to the common electrode layer, wherein an orthographic projection of at least one of the plurality of protrusion structures on the second substrate is within an orthographic projection of the common electrode line on the second substrate.

11. The liquid crystal display panel according to claim 9, wherein orthographic projections of the plurality of protrusion structures on the second substrate are distributed symmetrically on both sides of the gate line.

12. The liquid crystal display panel according to claim 6, wherein the plurality of spacers are arranged in an array, and spacers located in the same row are all first spacers or are all second spacers.

13. The liquid crystal display panel according to claim 12, wherein the first spacer and the second spacer are arranged alternately along a row direction.

14. The liquid crystal display panel according to claim 6, wherein the plurality of spacers comprise a primary spacer and a secondary spacer, a height of the primary spacer being greater than a height of the secondary spacer, and the first spacer and the second spacer being both secondary spacers.

15. A liquid crystal display device, comprising a driving circuit and the liquid crystal display panel according to claim 1.

* * * * *